Patented Nov. 26, 1929

1,737,121

UNITED STATES PATENT OFFICE

EMIL E. NOVOTNY, OF LOGAN, PENNSYLVANIA, ASSIGNOR TO JOHN STOGDELL STOKES, OF SPRING VALLEY FARMS, HUNTINGDON VALLEY, P. O., PENNSYLVANIA

PHENOL-FURFURAL RESIN AND METHOD OF MAKING SAME

No Drawing.    Application filed August 29, 1923.    Serial No. 660,027.

This invention relates to the incorporation of suitable hardening agents or accelerators in the manufacture of varnishes or plastics made of condensation products from furfurals and phenols, and is in the nature of an improvement on the subject matter of United States Letters Patent to Novotny and Kendall, No. 1,398,146, dated November 22, 1921.

I have found through lengthy experimentation and experience with actual commercial manufacture, that the method used in incorporating or introducing these accelerators or hardening agents may produce end or final products of different characteristics. Furthermore, the intermediate products are likewise subject to variations in keeping qualities, degree of plasticity, uniformity, and the rate of speed at which they will react to infusibility. Likewise, the method of treatment of the varnish or plastic material has much to do with the elimination of undesirable by-products in the finished, infusible material, especially when such material is reacted under heat and pressure in steel dies.

I have further found it unnecessary and objectionable from certain standpoints to produce dry, anhydrous resins. Likewise, the use of dry, anhydrous hardening agents is not at all essential and the finished product does not suffer from the standpoint of mechanical and electrical strength when such hardening agents are used wet.

I have likewise found that my furfural phenol condensation products do not react rapidly with hardening agents such as hexamethylenetetramin, formaldehyde, its polymers, or bodies containing or engendering the methylene radical, $CH_2$. The reaction when the materials are ordinarily treated is slower than reactions with phenol formaldehyde materials unless a higher temperature is used. However, the furfural phenol condensation products are in this way utilizable to advantage in that the methylene radical, $CH_2$, or, stated specifically, the hexamethylenetetramin or formaldehyde may be made to combine with such products and the reaction may be carried along at low temperatures for several hours without producing a rubbery or infusible mass. The intermediate product therefore can be treated to any desired point, the reaction stopped, and the final reaction subsequently resumed in a manner already well-known in the art. I have found that this permits the removal of large percentages of ammonia, one of the components of hexamethylenetetramin, and likewise water of condensation through the peculiarity that these primary combinations can be effected. Furthermore, even hardening or accelerating agents of a volatile nature such as formaldehyde, acetaldehyde or their polymers, such as paraformaldehyde or paraldehyde, may be combined with the condensation product in this manner so they will no longer volatilize but will, upon the subsequent application of heat, or heat and pressure, undergo the necessary change to produce the ultimate infusible and insoluble product. The water present may be removed by distillation, but I find that for the purpose of making varnishes and plastics it is preferable not to remove such water as it helps to keep the mass plastic, and when mixed with relatively small quantities of volatile solvent will act as a solvent therewith, thus producing economies in the use of solvent. The presence of this water does not make the mass sludgy or muddy, but permits of thorough impregnation into paper, canvas or fillers, from which it is readily removed in the operation of drying such products, as in an ordinary vacuum or open air oven. Likewise, this large percentage of water seems to permit of more rapid drying of the final product in that there is no formation of a viscous, jellylike or case-hardened surface on the material being dried, and at the same time seems to have the effect of being an anti-catalyst for the final reaction while the drying is in progress.

It has been found that furfurals and phenols combine, resulting in products of either liquid, syrupy, plastic or resinous form. The resinous materials have various melting points as from slightly above room temperature to temperatures just below their point of decomposition, and are all completely soluble in various well-known solvents and subsequently can be converted into infusible, insoluble products by prolonged heating or heating at elevated temperatures. This permits of considerable ease in handling commercial operations as, for example, it is possible to mix these liquid, syrupy or pasty materials with various hardeners, accelerators, fillers, etc. and secure very satisfactory impregnation on the mixing rolls without the intermediate use of any solvent. It will likewise be found that these condensation products are very soluble in furfural, formaldehyde, acetaldehyde, or watery solutions of hexamethylenetetramin. If given a heat treatment, a very simple and commercially convenient method is available for the proper combination of these materials with the condensation product of phenols and furfurals, and that therefore a varying degree of intermediate reaction may be given before the materials are used for coating, impregnation, or otherwise that is well-known in the making of laminated structures and in the mixing with fillers.

My further observation in the behavior of the furfural phenol condensation product free of uncombined phenol shows that it hardens more rapidly in the presence of small percentages of materials containing the methylene radical, $CH_2$. I find that as, for example, when hexamethylenetetramin is used, a mere trace of this will accelerate the reaction although percentages somewhat higher are more satisfactory. On the other hand, I find that where hexamethylenetetramin is used in high percentages, say up to twenty-five per cent of the weight of the phenol free resin, it is entirely combined; that is, greatly increasing the amount of hexa does not increase the accelerating power. These statements are made to indicate clearly that the methylene radical accelerates the reaction and combines with the new compounds formed of furfural and phenol. These examples can likewise be applied to other methylene containing bodies such as formaldehyde, paraformaldehyde and, to a somewhat less extent, to other aldehydes and their derivatives such as furfural, methylfurfural, acetaldehyde, and anhydroformaldehyde aniline, their polymers and homologues.

Furthermore, there are other bodies capable of exercising a marked catalytic or accelerating action on these phenol furfural resins which do not contain the active methylene group, $CH_2$, or are not aldehydes or aldehyde derivatives as previously mentioned; for instance, such as hydrochloric and sulphuric acids, or acid liberating substances. These acid substances, however, are not adaptable for molding materials, or compounds which are to be pressed in steel dies. However, the alkaline or basic substances themselves have a marked accelerating action and these, if used in small percentages, would have no injurious effect in this respect, such, for instance, as hydrobenzamid, soda lime, urea, and alkaline salts. Furthermore, weak acids show an accelerating action as, for example, stearic acid. This material is commonly used in the molding art as a lubricant in order that upon pressing in a heated die a thin film of stearic acid will be interposed between the face of the molded article and the mold. I have found, however, on the contrary, that small percentages of stearic acid will accelerate the reaction of our resin. In the matter of soda lime, two and one-half per cent by weight of this material to the weight of the resin will cause a reaction to take place quickly at, say, from 300 to 400° F. Where potassium carbonate is used a slightly greater percentage than that required with soda lime is considered desirable.

In the Novotny-Kendall co-pending application Serial Number 501,273, filed September 17, 1921, has been shown the production of resinous condensation products of furfural and phenol without the use of a catalyst. By variation in the time of the reaction or the temperature at which the reaction takes place or change in the proportions given, various products can be obtained which will act similarly to and with the substances enumerated in the preceding paragraphs. Exhaustive experiments were made in order to determine the combining ratio of phenol and furfural. For this purpose a suitable fractionating column was attached directly to the reaction vessel. It was thus possible to retain all the phenol in the reaction mixture and distill off nothing but furfural and water. In experiments where large proportions of furfural were employed in conjunction with a basic catalyst such as potassium carbonate, it was noted that when the evolution of furfural and water decreased and the temperature in the kettle rose simultaneously, that the reacting mixture was extremely sensitive to heat and was very readily rendered infusible. This seems to indicate that the use of large amounts of furfural in the reacting mixtures renders them very potentially reactive. Throughout the course of these experiments, in which widely different ratios of furfural and phenol were employed, in each case it was found these two substances combined in approximately equimolecular ratios. Similarly to furfural, it was determined that furfuramid combines with phenol to give a very reactive condensation product which can be made into either one of low melting point or the melting point of which can be brought up until the infusible stage has been reached. Where potassium carbonate is used as a catalyst to the extent of five per cent of the phenol weight, 100 parts of furfuramid combine with approximately 20 parts of phenol. This furfuramid phenol product is very reactive at temperatures from 300 to 400° F. without a catalyst, and can be hardened with hexamethylenetetramin, other methylene bodies and other accelerators as described in the case of resins made from furfural and phenol. It should also be noted that where furfuramid is used, anhydrous resins may be very readily obtained.

I will now cite certain examples in order to illustrate my specific meaning. It is, of course, understood that the temperatures, proportions, etc., are purely illustrative and that wide variation may be made therein without materially departing from the spirit of the specification or the appended claims.

The following examples illustrate the preparation of various syrups or liquid condensation products of furfural and phenol.

Example 1

In a suitable vessel connected to a condenser, to 100 parts of phenol add 75 parts of furfural and ½ part potassium carbonate. The mixture is heated to 300° F., at which stage the external heat is discontinued and the mass of itself increases in temperature to 305° F. It is then allowed to gradually cool for a period of 8 to 12 hours. The product thus obtained is semi-solid whereas if the mass, after reacting at 305° F., is rapidly chilled, a thin, syrupy product is obtained. It should be noted that in both cases the reacting mixture is completely combined.

Example 2

In a suitable vessel connected to a condenser, to 100 parts of phenol add 75 parts of furfural and ¼ part of potassium carbonate. Heat to 350° F., allow the reaction to proceed for 30 minutes, and cool the mixture. A semi-solid product is thus obtained.

Example 3

In a suitable vessel connected to a condenser, to 100 parts of phenol add 75 parts of furfural and 1 part of potassium carbonate. Heat to 315° F. Remove the heat and a vigorous exothermic reaction ensues. If the mass is rapidly cooled, a thin syrup is obtained. If, however, a semi-solid product is desired, the material is allowed to cool slowly for 6 to 8 hours.

Example 4

In a suitable vessel connected to a condenser, to 100 parts of phenol add 125 parts of furfural and ½ part of potassium carbonate. Heat to 300° F. Discontinue the heating and either cool rapidly or allow to stand over night, according to whether a thin, syrupy product or a semi-solid product is desired. The product obtained in this example is extremely sensitive to heat and is readily convertible to the infusible state without the addition of any accelerating or hardening agent.

In the above examples where it is not desired to obtain liquid, syrupy or pasty condensation products, on longer heating at the maximum temperatures given harder products will be obtained. It is thus possible to convert these thin, liquid products to fusible, soluble, dry, amorphous resins breaking with a conchoidal fracture. Furthermore, any of these products, if heated at elevated temperatures for a sufficient length of time, will become infusible and insoluble.

The following examples illustrate various methods of adding accelerating or hardening agents to the fusible phenol furfural condensation products:

Example 5

In a suitable vessel connected to a reflux condenser containing 100 parts of a syrup or semi-solid condensation product prepared as described in Examples 1 to 4, add and thoroughly mix therewith 23 parts of a 45% water solution of hexamethylenetetramin. The mass is brought to ebullition and allowed to boil for a period of 2 to 3 hours. During this time it will be noted that considerable quantities of ammonia gas are evolved. The product thus obtained is extremely reactive and is absolutely free from greenness; i. e., will mold without too much lateral flow.

In the above example a 40% water solution of formaldehyde (formalin) may be substituted for the watery hexamethylenetetramin where it is desired to produce a product free from ammonia. This substitution is illustrated in the following example:

Example 6

To 100 parts of a molten liquid or syrupy condensation product of phenol and furfural prepared as illustrated in Examples 1 to 4 inclusive, add in a suitable vessel connected to a reflux condenser 32 parts of a 40% water solution of formaldehyde. After thorough mixing the mixture is brought to ebullition and boiled for a period of 2 to 3 hours.

In Examples 5 and 6 the boiling causes the methylene accelerator or hardener to combine with the phenol furfural condensation product and thus prevents its subsequent loss due to volatilization.

Where it is desired to prepare an extremely sensitive condensation product of phenol and a furfural derivative, it has been found advantageous to use furfuramid in the place of furfural. The following example illustrates a mode of procedure using this substance:

Example 7

To 50 parts of molten phenol placed in a suitable vessel connected to a reflux condenser, add 100 parts of furfuramid. The resulting solution is boiled for 30 minutes. The vessel is then connected to a condenser and phenol is distilled off until a resin, solid at room temperatures, is obtained. Great care should be taken in not carrying the distillation too far, as the product is very readily caused to become infusible. This product may be dissolved in alcohol and manipulated in a manner similar to the furfural phenol condensation product. If it is desired to obtain a product even more reactive than in the above example, 2 to 5 parts of potassium carbonate for each 100 parts of phenol may be added as an accelerating agent to the mixture previous to the condensation. If, in this example, a mineral acid such as hydrochloric acid or sulphuric acid is employed as a condensing agent in place of the potassium carbonate, it is found that the nascent furfural combines very rapidly with the phenol. Under proper manipulation a liquid or syrupy condensation product may be obtained with furfuramid as well as with furfural. Even though this furfuramid phenol condensation product is in itself extremely reactive, in certain cases it is found advantageous to incorporate therewith a methylene containing, hardening, or accelerating agent which, if desirable, may be combined as in the examples previously stated.

The previously cited examples illustrate the preparation or incorporation with accelerating or hardening agents or syrups or plastics readily fluid at temperatures below 160° F. The hard, soluble, fusible resins melting above 160° F. must be handled differently as the mixture of resin and hardener or accelerator is extremely reactive at temperatures somewhat above this point. Where it is desired to handle condensation products of this type the following procedure is employed:

*Example 8*

The higher melting condensation products of phenol and furfural are dissolved in an amount of solvent, preferably just sufficient to give a mass that is liquid at 160° F. It has been found, in practice, that 25 to 35 parts of a solvent for each 100 parts of the condensation product is a sufficient quantity. The solution thus obtained is heavy and sludgelike at normal temperatures. To this hot solution add 23 parts of a 45% aqueous solution of hexamethylenetetramin for each 100 parts of the dissolved condensation product, or an equivalent amount of a 40% solution of formaldehyde; i. e., in this example 32 parts. The mass is thoroughly mixed in a suitable vessel connected to a reflux condenser and caused to boil for a period of 2 to 3 hours. As in the previously cited examples, this boiling causes the hardening or accelerating agent to enter into combination with the furfural phenol condensation product.

*Example 9*

When it is desired, in the preparation of the phenol furfural condensation product, to obtain a natural black without the incorporation of any foreign material, the acid and basic condensation may be combined. For this purpose the reaction between phenol in excess and furfural in the presence of hydrochloric acid is carried out as stated in the Novotny-Kendall Patent Number 1,398,146, issued November 22, 1921, but instead of distilling off the excess phenol the mixture is neutralized with a strong base such as sodium or potassium hydroxide. To the neutralized mixture add sufficient furfural to combine with the excess phenol and 2 to 5% of the weight of phenol in potassium carbonate. This mixture is then treated as described in the Novotny-Kendall Patent Number 1,398,146, issued November 22, 1921, or in the co-pending application Number 501,273, filed September 17, 1921, or, if desired, as described herein. This method is extremely advantageous as a very brilliant and fast black resin, plastic or varnish is obtained.

In the examples given it should be noted that various methods are employed to obtain the phenol furfural condensation product in such a condition that at a temperature below its hardening point it can be readily mixed with the proper hardening agents. The intimate mixtures or, as a matter of fact, solutions thus obtained make it possible to actually combine the hardening agents with the phenol furfural condensation products. Wherein it is desired to produce a commercial varnish such as can be used for dipping or spreading with a brush, after carrying out the reaction between the hardener and condensation product, the mass must be thinned by the addition of a sufficient quantity of a suitable solvent. Of course, in commercial practice it is not necessary to cool to room temperatures the condensation products obtained, but in the case of the syrups or fluids, they are cooled to 160° F. or thereabouts and the hardening or accelerating agent is added as described. And in the case of condensation products solid at room temperatures, the small amount of solvent may be added to the hot fluid product and the hardening agent subsequently added at a temperature not above 160° F. The addition of solvent in this manner greatly facilitates the cooling of the hot condensation product from its reaction temperature to the temperature desired, as the reacting vessel at this stage is connected to a reflux condenser which condenses and returns to the vessel the alcohol distilled off, and thus rapidly removes heat from the product. In the examples given, wet accelerating agents are employed merely as a convenient expedient, but if it should be desirable, the dry accelerating agents may be incorporated. However, it should be borne in mind that the wet methods give final, infusible products more rapidly hardened and superior in strength, both electrical and mechanical, to those obtained with the dry material. The wet method, wherein hexa is employed, permits the convenient elimination of ammonia which would otherwise be generated during the final hardening process in the mold or die.

Wherein I use the term phenol or phenols I wish it to include cresols, resorcinol, naphthols, and other homologues of phenol as well as phenol ethers or mixtures of these. It has been found that by using various phenols or phenolic bodies, condensation products or final infusible products possessing widely different properties may be obtained. Products varying in properties from highly infusible, hard, brittle to soft, elastic and non-brittle may be obtained. The phenols may be mixed previous to the condensation with furfural, or the condensation products of different phenols may be mixed previous to being hardened. It has thus been found possible to produce infusible products sufficiently non-brittle to be cold punched. By the term furfural I mean it to embrace not only furfural but any furfural derivative, furfural engendering body, or homologue of furfural such as, for example, ethyl or methylfurfural. Wherein I have shown hexa, I wish it to include other bodies containing reactive methylene containing groups, for example, paraformaldehyde, trioxymethylene, formaldehyde, etc. Wherein I mention the use of an acid hardening agent, this method should be clearly differentiated from the process of adding this catalyst for the condensation of the phenol and furfural; in fact, the initial furfural phenol product may be made with a basic catalyst as described in the above examples or in co-pending application Serial Number 501,273, filed September 17, 1921, and then subsequently hardened by the use of an acid catalyst. This remark is also applicable to the use of basic hardening or accelerating agents as they may be used in conjunction with a phenol furfural condensation product obtained without the use of a catalyst.

In practice, I have found that satisfactory condensations can be obtained with only a trace of an acid condensing agent. I have also found that instead of hydrochloric acid as described in the Novotny-Kendall Patent Number 1,398,146, issued November 22, 1921, I can also employ sulphuric acid, potassium pyrosulphate and ammonium chloride as condensing agents.

The methods of condensing phenols and furfurals described in the Novotny-Kendall Patent Number 1,398,146, issued November 22, 1921, were developed and put into practice before American furfural was available. The European furfural used was prepared from kapok. This latter furfural contains considerable methylfurfural whereas the American product manufactured from corn cobs and oat hulls does not contain the methyl homologue in appreciable quantities. It appears that the methylfurfural can be employed in larger ratios with the phenol in the acid condensation. It has been found that with the American commercial grade of furfural, 14 parts or less can be employed with 100 parts of phenol without danger of the mixture becoming prematurely infusible. If this ratio is materially increased, the product is likely to become rubbery or infusible. Of course, with low temperature distillation under vacuum, this proportion could undoubtedly be increased.

What I claim is—

1. A potentially reactive liquid or semi-solid condensation product of phenol and furfural, wherein substantially all of the phenol and furfural are in chemical combination, the product being characterized by maintaining, in the absence of heat, its liquid or semi-solid condition without reaction, for a prolonged period of time.

2. A potentially reactive liquid or semi-solid condensation product of phenol and furfural, wherein substantially all of the phenol and furfural are in chemical combination, the product being characterized by maintaining, in the absence of heat, its liquid or semi-solid condition without reaction, for a prolonged period of time, said condensation product having a hardening agent incorporated therein, the mass so constituted being capable of assuming an insoluble and infusible state under the application of sufficient heat.

3. A potentially reactive liquid or semi-solid condensation product of phenol and furfural, wherein substantially all of the phenol and furfural are in chemical combination, the product being characterized by maintaining, in the absence of heat, its liquid or semi-solid condition without reaction, for a prolonged period of time, said condensation product having a hardening agent incorporated therein under the application of heat while said product is in its liquid or semi-solid state, the mass so constituted being capable of assuming an insoluble and infusible state under the application of heat.

4. A potentially reactive liquid or semi-solid condensation product of phenol and furfural, wherein substantially all of the phenol and furfural are in chemical combination, the product being characterized by maintaining, in the absence of heat, its liquid or semi-solid condition without reaction, for a prolonged period of time, said condensation product having a liquid or wet hardening agent incorporated therein while said product is in its liquid or semi-solid state.

5. A potentially reactive liquid or semi-solid condensation product of phenol and furfural formed in the presence of a small amount of catalyst, and wherein substantially all of the phenol and furfural are in chemical combination, the product being characterized by maintaining, in the absence of heat, its liquid or semi-solid condition without reaction, for a prolonged period of time.

6. A potentially reactive liquid or semi-solid condensation product of phenol and furfural formed in the presence of a small amount of catalyst, and wherein substantially all of the phenol and furfural are in chemical combination, the product being characterized by maintaining, in the absence of heat, its liquid or semi-solid condition without reaction, for a prolonged period of time, said condensation product having a hardening agent incorporated therein, the mass so constituted being capable of assuming an insoluble and infusible state under the application of heat.

7. A potentially reactive liquid or semi-solid condensation product of phenol and furfural, wherein substantially all of the phenol and furfural are in chemical combination, the product being characterized by maintaining, in the absence of heat, its liquid or semi-solid condition, without reaction, for a prolonged period of time, said condensation product having an active methylene body incorporated therein as a hardening agent.

8. A potentially reactive liquid or semi-solid condensation product of phenol and furfural, wherein substantially all of the phenol and furfural are in chemical combination, the product being characterized by maintaining, in the absence of heat, its liquid or semi-solid condition, without reaction, for a prolonged period of time, said condensation product having formaldehyde incorporated therein as a hardening agent.

9. A potentially reactive liquid or semi-solid condensation product of phenol and furfural, wherein substantially all of the phenol and furfural are in chemical combination, the product being characterized by maintaining, in the absence of heat, its liquid or semi-solid condition, without reaction, for a prolonged period of time, said condensation product having an active methylene body chemically combined therewith under the action of heat, and acting as a hardening agent.

10. A potentially reactive liquid or semi-solid condensation product of phenol and furfural, the product being characterized by maintaining, in the absence of heat, its liquid or semi-solid condition, without reaction, for a prolonged period of time, and an active methylene containing body combined with such product, the mass being capable, under the application of heat, of assuming an insoluble and infusible state.

11. The herein described method which comprises heating a mixture of phenol and furfural for a sufficient length of time to produce a potentially reactive liquid or semi-solid condensation product wherein substantially all of the phenol and furfural are in chemical combination, and which mass will maintain its liquid or semi-solid condition for a prolonged period of time, in the absence of heat.

12. The herein described method which comprises heating a mixture of phenol and furfural for a sufficient length of time to produce a potentially reactive liquid or semi-solid condensation product wherein substantially all of the phenol and furfural are in chemical combination, and which mass will maintain its liquid or semi-solid condition for a prolonged period of time in the absence of heat, and incorporating with said mass a hardening agent, the mass in its liquid or semi-solid form acting as a vehicle to carry the hardening agent in a substantially inactive condition in the absence of heat.

13. The herein described method which comprises heating a mixture of phenol and furfural for a sufficient length of time to produce a potentially reactive liquid or semi-solid condensation product wherein substantially all of the phenol and furfural are in chemical combination, and which mass will maintain its liquid or semi-solid condition for a prolonged period of time in the absence of heat, and incorporating with said mass, an active methylene body as a hardening agent, such mass acting as a vehicle to carry such hardening agent in a substantially inactive condition in the absence of heat.

14. The herein described method which comprises heating a mixture of phenol and furfural for a sufficient length of time to produce a potentially reactive liquid or semi-solid condensation product wherein substantially all of the phenol and furfural are in chemical combination, and which mass will maintain its liquid or semi-solid condition for a prolonged period of time in the absence of heat, and incorporating with said mass, formaldehyde as a hardening agent, such mass acting as a vehicle to carry such hardening agent in a substantially inactive condition in the absence of heat.

15. The herein described method which comprises heating a mixture of phenol and furfural for a sufficient length of time to produce a potentially reactive liquid or semi-solid condensation product which will maintain its liquid or semi-solid condition for a prolonged period of time in the absence of heat, and then chemically combining with such liquid or semi-solid product a hardening agent which will remain inactive in the absence of heat.

16. The herein described method which comprises heating a mixture of phenol and furfural for a sufficient length of time to produce a potentially reactive liquid or semi-solid condensation product which will maintain its liquid or semi-solid condition for a prolonged period of time in the absence of heat, and then chemically combining with such liquid or semi-solid product a hardening agent which will remain inactive in the absence of heat, and subsequently heating the mass so constituted to cause such mass to assume a hard and fusible condition.

17. The process of producing synthetic plastic material, which comprises partial condensation of a phenolic body with an excess over equimolecular proportions of a substance exhibiting marked solvent properties with respect to the partial condensation product and also adapted to act as an ultimate hardening agent therefor, and controlling the condensation reaction so that it may be positively arrested at any intermediate stage.

18. The process of producing synthetic plastic material, which comprises partial condensation of a phenolic body with an excess over equimolecular proportions of a substance adapted to act as an ultimate hardening agent for the partial condensation product and which is itself capable of resinification without chemical combination with any other reagent, and controlling the condensation reaction so that it may be positively arrested at any intermediate stage.

19. The process of producing synthetic plastic material, which comprises partial condensation of a phenolic body with an excess over equimolecular proportions of a substance which is itself capable both of volatilization and of resinification by catalytic action without chemical combination with any other reagent and which is adapted to act as an ultimate hardening agent for said partial condensation product, and controlling the condensation reaction so that it may be positively arrested at any intermediate stage whereby the product is adapted to form giving treatment.

20. The process of producing synthetic plastic material, which comprises partial condensation of a phenolic body with an excess over equimolecular proportions of a substance which is itself capable both of volatilization and of resinification by catalytic action without chemical combination with any other reagent and which is adapted to exhibit marked solvent properties with respect to the partial condensation product and to act as an ultimate hardening agent therefor, and controlling the condensation reaction so that it may be positively arrested at any intermediate stage whereby the product is adapted to form giving treatment.

21. The process of producing synthetic plastic material, which comprises partial condensation of a phenolic body with an excess over equimolecular proportions of furfural, and controlling the condensation reaction so that it may be positively arrested at any intermediate stage.

22. The process of producing synthetic plastic material which comprises partial condensation of a phenolic body with a fural yielding substance in a quantity in excess of equimolecular proportions whereby the latter is adapted to act as an ultimate hardening agent for said plastic material, and controlling the condensation reaction so that it may be positively arrested at any intermediate stage of the reaction.

23. The process which comprises condensing a phenolic body with fural yielding substance in the presence of a non-ammoniacal alkaline catalyst thereby causing cessation of the condensation at an intermediate stage wherein a substantial percentage of the phenolic body is uncombined with the fural yielding substance, proportioning the total quantities of the phenolic body and fural substance to afford an excess of the fural substance over equimolecular proportions with respect to the phenolic body, and thereafter heat hardening the product.

Signed at Philadelphia in the county of Philadelphia and State of Pennsylvania this 28th day of August A. D. 1923.

EMIL E. NOVOTNY.